United States Patent
Tan et al.

(10) Patent No.: US 12,002,299 B2
(45) Date of Patent: Jun. 4, 2024

(54) REMOTE VEHICLE DIAGNOSTIC AND DETECTION METHOD BASED ON INSTANT MESSAGING COMMUNICATION, ELECTRONIC DEVICE, AND STORAGE MEDIUM

(71) Applicant: THINKCAR TECH CO., LTD., Guangdong (CN)

(72) Inventors: Bin Tan, Guangdong (CN); Qilong Liao, Guangdong (CN); Lingcong Xiao, Guangdong (CN)

(73) Assignee: THINKCAR TECH CO., LTD., Shenzhen (CN)

( * ) Notice: Subject to any disclaimer, the term of this patent is extended or adjusted under 35 U.S.C. 154(b) by 399 days.

(21) Appl. No.: 17/399,125

(22) Filed: Aug. 11, 2021

(65) Prior Publication Data

US 2023/0009246 A1    Jan. 12, 2023

(30) Foreign Application Priority Data

Jul. 6, 2021 (CN) .......................... 202110761179.2

(51) Int. Cl.
| G07C 5/00 | (2006.01) |
| G06Q 20/10 | (2012.01) |
| G07C 5/08 | (2006.01) |
| H04L 51/046 | (2022.01) |
| H04L 51/10 | (2022.01) |

(52) U.S. Cl.
CPC ............ *G07C 5/008* (2013.01); *G06Q 20/102* (2013.01); *G07C 5/0808* (2013.01); *H04L 51/046* (2013.01); *H04L 51/10* (2013.01)

(58) Field of Classification Search
CPC .. G07C 5/008; G07C 5/0808; G07C 2205/02; G06Q 20/102; H04L 51/046; H04L 51/10; G05B 23/0213
See application file for complete search history.

(56) References Cited

U.S. PATENT DOCUMENTS

| 2014/0359018 | A1* | 12/2014 | Sun ........................ H04L 65/403 709/204 |
| 2022/0161761 | A1* | 5/2022 | Moeller ................ H04L 9/0643 |

FOREIGN PATENT DOCUMENTS

| CA | 2441895 | A1 | 3/2004 |
| CN | 101986223 | A | 3/2011 |
| CN | 102436259 | A | 5/2012 |
| CN | 102830690 | A | 12/2012 |
| CN | 102968112 | A | 3/2013 |
| CN | 106200608 | A | 12/2016 |
| CN | 107885187 | A | 4/2018 |
| CN | 108733029 | A | 11/2018 |
| CN | 109982134 | A | 7/2019 |
| CN | 110926481 | A | 3/2020 |

(Continued)

OTHER PUBLICATIONS

European Search Report of Counterpart European Patent Application No. 21206333.3 completed on Apr. 22, 2022.

*Primary Examiner* — Rami Khatib (57) ABSTRACT

The present application discloses a remote vehicle diagnostic and detection method based on instant messaging communication, an electronic device, and a storage medium. The process is not only faster to obtain car data, but also to obtain more description information based on instant messaging communication, which improves the efficiency of remote vehicle diagnostic and exclusion.

20 Claims, 2 Drawing Sheets

(56) References Cited

FOREIGN PATENT DOCUMENTS

| WO | 2020024263 | A1 | 2/2020 |
|---|---|---|---|
| WO | 2021037965 | A1 | 3/2021 |

* cited by examiner

FIG. 1

FIG. 2

REMOTE VEHICLE DIAGNOSTIC AND DETECTION METHOD BASED ON INSTANT MESSAGING COMMUNICATION, ELECTRONIC DEVICE, AND STORAGE MEDIUM

CROSS-REFERENCE TO RELATED APPLICATIONS

This application claims all benefits of priority from Chinese Patent Application No. CN202110761179.2, filed on Jul. 6, 2021, in the State Intellectual Property Office of China, entitled "Remote vehicle diagnostic and detection method based on instant messaging communication, electronic device, and storage medium" the content of which is hereby incorporated by reference.

FIELD OF INVENTION

The present application relates to the field of on-board diagnostics technology, particularly to a remote vehicle diagnostic and detection method based on instant messaging communication, an electronic device, and a storage medium.

BACKGROUND OF INVENTION

At present, when the vehicle breaks down and needs to be repaired, it's generally to go to the 4S service center for after-sales service, or to be repaired by repair workshop, or to be repaired by the user. When servicing is performed in the foregoing several manners, the servicing may be inexperienced and the servicing may not be completed.

Based on the above circumstances, a remote vehicle diagnostic technology is currently present. That is, a vehicle fault remote diagnostic instrument is connected to an OBD vehicle diagnostic interface of the vehicle to collect parameters of the vehicle, and upload the parameters to a cloud server. Then, the cloud server feeds back a diagnostic and maintenance recommendation report based on the uploaded vehicle parameters. After receiving the diagnostic and maintenance recommendation report through other terminals, the vehicle could be repaired by the user refer to the diagnostic and maintenance recommendation. Although the vehicle could be repaired by the user refer to the diagnostic and maintenance recommendation, the user may be limited to its own professional capability, and the vehicle cannot be repaired independently, and more technical support is needed during the repair process. It can be seen that the existing remote vehicle diagnostic technology cannot provide comprehensively reliable diagnostic data, and the efficiency of remote vehicle diagnostic and exclusion is reduced.

SUMMARY OF THE INVENTION

The present application provides a remote vehicle diagnostic and detection method based on instant messaging communication, electronic device, and storage medium, and are intended to solve the problem in the prior art that a remote vehicle diagnostic technology cannot provide comprehensively reliable diagnostic data, and the efficiency of remote vehicle diagnostic and exclusion is reduced.

In a first aspect, the present application provides an embodiment of a remote vehicle diagnostic and detection method based on instant messaging communication comprising the steps of: responding to a communication connection instruction, obtaining an online terminal list and displaying the online terminal list; when detecting a target terminal selection instruction, obtaining a target terminal from the online terminal list, and establishing a communication connection with the target terminal; acquiring first instant messaging data and sending the first instant messaging data to the target terminal; receiving first order data sent by the target terminal according to the first instant messaging data; wherein the first order data comprises a vehicle basic information acquisition request, merchant information, payment information, and a remote analog terminal connection address; when detecting a first order agreement instruction, establishing a connection with a remote analog terminal through the remote analog terminal connection address; obtaining electric control system information and basic information of the vehicle; when detecting a remote diagnostic instruction, sending the electric control system information and basic information of the vehicle to the remote analog terminal; receiving and parsing remote adjustment instructions to obtain vehicle adjustment instructions; sending the adjustment instructions to the vehicle corresponding to the basic information of the vehicle; when detecting a communication end instruction, disconnecting the connection with the remote analog terminal.

In a second aspect, the present application provides an electronic device comprising: a memory, for storing a program to execute in a processor; and a processor, for executing the program stored in the memory to achieve the method comprising the steps of: responding to a communication connection instruction, obtaining an online terminal list and displaying the online terminal list; when detecting a target terminal selection instruction, obtaining a target terminal from the online terminal list, and establishing a communication connection with the target terminal; acquiring first instant messaging data and sending the first instant messaging data to the target terminal; receiving first order data sent by the target terminal according to the first instant messaging data; wherein the first order data comprises a vehicle basic information acquisition request, merchant information, payment information, and a remote analog terminal connection address; when detecting a first order agreement instruction, establishing a connection with a remote analog terminal through the remote analog terminal connection address; obtaining electric control system information and basic information of the vehicle; when detecting a remote diagnostic instruction, sending the electric control system information and basic information of the vehicle to the remote analog terminal; receiving and parsing remote adjustment instructions to obtain vehicle adjustment instructions; sending the adjustment instructions to the vehicle corresponding to the basic information of the vehicle; when detecting a communication end instruction, disconnecting the connection with the remote analog terminal.

In another aspect, the present application further provides an embodiment of a computer readable storage medium, for storing one or more programs executed by one or more processors to achieve the method comprising the steps of: responding to a communication connection instruction, obtaining an online terminal list and displaying the online terminal list; when detecting a target terminal selection instruction, obtaining a target terminal from the online terminal list, and establishing a communication connection with the target terminal; acquiring first instant messaging data and sending the first instant messaging data to the target terminal; receiving first order data sent by the target terminal according to the first instant messaging data; wherein the first order data comprises a vehicle basic information acquisition request, merchant information, payment information, and a remote analog terminal connection address; when detecting a first order agreement instruction, establishing a connection with a remote analog terminal through the remote analog terminal connection address; obtaining electric control system information and basic information of the vehicle; when detecting a remote diagnostic instruction, sending the electric control system information and basic information of the vehicle to the remote analog terminal; receiving and parsing remote adjustment instructions to obtain vehicle adjustment instructions; sending the adjustment instructions to the vehicle corresponding to the basic information of the vehicle; when detecting a communication end instruction, disconnecting the connection with the remote analog terminal.

The present application provides a remote vehicle diagnostic and detection method based on instant messaging communication, an electronic device, and a storage medium. When detecting a target terminal selection instruction, a target terminal is obtained from the online terminal list, and a communication connection is established with the target terminal. After completing the initial connection and communication, first order information is received sent by the target terminal. After responding to the first order information and establishing a connection with the remote analog terminal, electric control system information and basic information of the vehicle is obtained, and then the electric control system information and basic information of the vehicle is sent to the remote analog terminal, and remote vehicle diagnostic and detection is performed based on the remote analog terminal. Thus, remote vehicle diagnostic and detection based on instant messaging communication is realized. The above process is not only faster to obtain car data, but also to obtain more description information based on instant messaging communication, which improves the efficiency of remote vehicle diagnostic and exclusion.

BRIEF DESCRIPTION OF THE DRAWINGS

In order to more clearly illustrate the embodiments of the present application, accompanying drawings required for describing the embodiments are used for simple introduction. Apparently, these drawings are used for the description below for some embodiments of the present application only, and people having ordinary skill in the art can derive from other drawings from these drawings without creative efforts.

DESCRIPTION OF THE EMBODIMENTS

The technical solutions in the embodiments of the present disclosure are clearly and completely described in the following with reference to the accompanying drawings in the embodiments of the present disclosure, obviously, the described embodiments are a part of the embodiments of the present disclosure, and not all of the embodiments. All other embodiments obtained by person skilled in the art based on the embodiments of the present disclosure without creative work fall into the protection scope of the present disclosure.

It should be understood that, when used in the present description and the appended claims, the terms "compris-ing" and "including" refer to the presence of described features, integers, steps, operations, elements, and/or components, but don't exclude the presence or addition of one or more of other features, integers, steps, operations, elements, components, and/or collections thereof.

It should be also understood that, the terms used herein in the description of the present disclosure is for the purpose of describing particular embodiments and is not intended to limit the present disclosure. As used in the description of the present disclosure and the appended claims, a singular form of "a", "one" and "the" are meant to include the plural form unless the context clearly indicates other situations.

It should be further understood that, the term "and/or" used in the description of the present disclosure and the appended claims means any combination and all possible combinations of one or more of the associated listed items, and includes these combinations.

Figure 1:
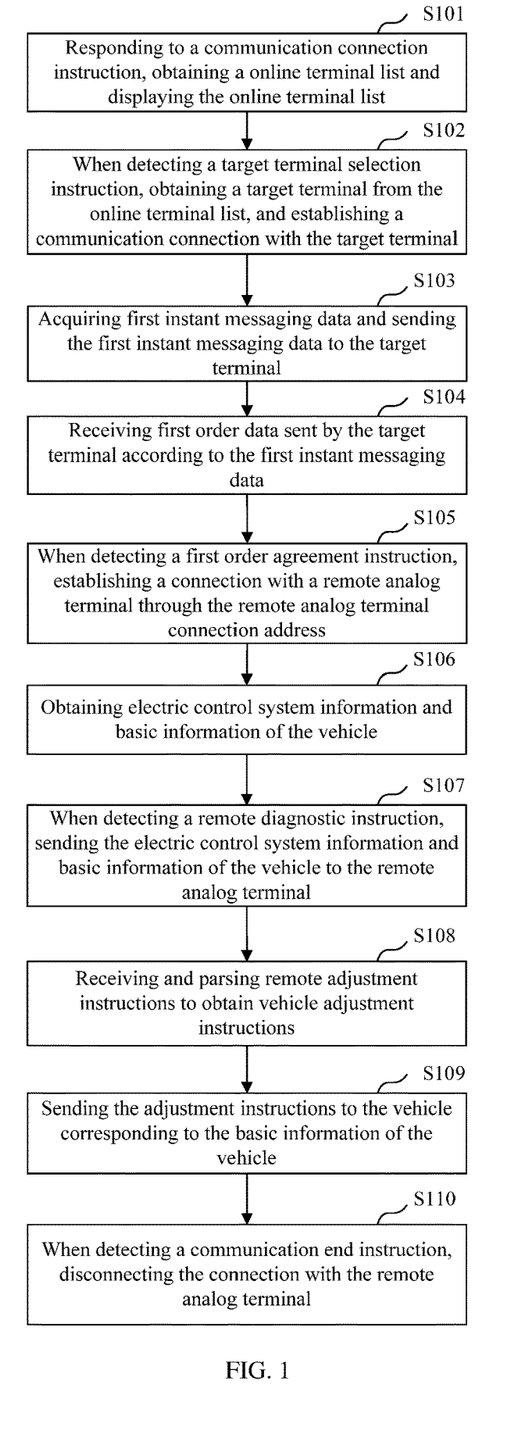
FIG. 1 is a flow chart of remote vehicle diagnostic and detection method based on instant messaging communication in accordance with an embodiment of the present application.

With reference to FIG. 1 for a flow chart of remote vehicle diagnostic and detection method based on instant messaging communication in accordance with an embodiment of the present application, the method may be applied in a user terminal, and the method is executed by the application software installed in the user terminal.

In FIG. 1, the method comprises the following steps S101-S110.

S101: Responding to a communication connection instruction, obtaining an online terminal list and displaying the online terminal list.

In the present embodiment, in order to more clearly illustrate the embodiments of the present application, the execution entity involved will be described in detail below. In the present application, the user terminal is used as an execution entity to describe a technical solution.

The user terminal, which can be understood as an intelligent terminal integrating a vehicle fault diagnostic function and an instant messaging function. For example, in order to more conveniently implement the instant messaging function, a touch control screen may be specifically set for the user to edit, send and view the instant message.

A vehicle, which is a to-be-detected vehicle connected to the user terminal, and electric control system information and basic information of the vehicle can be read by the user terminal which is connected to the vehicle.

A server cluster, which includes a service server, a central server, a UDP server, and a relay server. The service server may correspond to a plurality of terminals (more specifically, may be understood as a PC machine used by a merchant, and each terminal has an online state and an offline state). After the user terminal establishes a connection with a terminal in an online state in the server cluster, it can be understood that a communication connection is established with the target terminal, and at this time, the user terminal and the target terminal can perform instant messaging (For example, the user terminal and the target terminal may transmit data in the form of text, pictures, voice, video, etc. to each other). Thereby acquiring some description information related to the vehicle to generate first order data.

A remote analog terminal, which establishes a communication connection with the user terminal after the user terminal responds to the order information, and then acquires electric control system information and basic information of the vehicle, the electric control system information and basic information of the vehicle are collected and uploaded by the user terminal, and can simulate and restore the vehicle after loading the electric control system information and basic information of the vehicle.

A vehicle fault diagnostic instrument, which can be connected to the remote analog terminal by means of a wired or wireless communication connection, so as to acquire electric control system information and basic information of the vehicle. After the merchant connects the vehicle fault diagnostic instrument with the remote analog terminal, the merchant may perform vehicle fault diagnostic and detection based on the side of the remote analog terminal. And after completing the vehicle fault diagnostic and detection, the merchant sends vehicle adjustment instructions to the user terminal, and the user terminal sends the vehicle adjustment instructions to the vehicle for fault elimination.

When a fault needs to be detected in the to-be-detected vehicle, the target terminal is firstly selected from an online terminal list displayed on a user interface and then a communication connection is established, thereby implementing instant messaging. Since the communication mode based on instant messaging is used, the user can operate the user terminal to select a vehicle maintenance technician with more diagnostic and maintenance experience. So that a more effective guidance prompt can be obtained, and the vehicle parameters and description information can be quickly acquired.

In the embodiment, before step S101, the method further includes: obtaining user's account information, and obtaining user's vehicle type information according to the user's account information; sending the user's vehicle type information to the server cluster; receiving an online terminal list sent by the server cluster according to user's vehicle type information.

In the present embodiment, when the user establishes a connection with the central server in the server cluster by using the user terminal, the central server firstly acquires the user account information, and the user account information includes information such as user name, user ID, and the user's vehicle type information. In this way, the central server can more accurately push the vehicle maintenance technician for diagnosing, detecting and servicing the vehicle to the user terminal according to the user's vehicle type information. Thus, a more accurate list of online terminals is pushed more accurately according to the user's vehicle type information.

S102: When detecting a target terminal selection instruction, obtaining a target terminal from the online terminal list, and establishing a communication connection with the target terminal.

In the present embodiment, the user may trigger the generation of the target terminal selection instruction after selecting any one of the terminals in the online terminal list displayed on the interface. After the user terminal sends the target terminal selection instruction to the central server, the central server forwards the target terminal selection instruction to the corresponding target terminal, thereby establishing a communication connection with the target terminal. In this way, the selected target terminal can be quickly connected for communication.

S103: Acquiring first instant messaging data and sending the first instant messaging data to the target terminal.

In the present embodiment, after the communication connection between the user terminal and the target terminal is completed, the user can perform instant communication with the target terminal by sending text information, pictures, voice information, short video (namely, video recorded through a video recording function of the user terminal within 5 minutes), online video (namely, starting through a video call function of the user terminal especially), etc. In this way, during the communication process, the user (namely, the merchant or the vehicle repair technician) corresponding to the target terminal may guide the user terminal operator in real time to describe a fault existing in vehicle, or guide the user to operate the user terminal to align some important positions of the vehicle by using the image pickup function thereof, so as to obtain first instant messaging data which containing detailed vehicle information. Specifically, the first instant messaging data is composed of one or more of text data, picture data, voice data, and video data.

S104: Receiving first order data sent by the target terminal according to the first instant messaging data; wherein the first order data comprises a vehicle basic information acquisition request, merchant information, payment information, and a remote analog terminal connection address.

In the present embodiment, after the initial connection and communication are completed, the user terminal receives the first order information sent by the target terminal, so as to determine whether to respond to the first order information to further establish a communication connection with the remote analog terminal. The first order data may be set to include the merchant information and the payment information in order to facilitate the user to view the detailed information of the merchant who performs the remote diagnostic of the vehicle or the vehicle repair technician at this time. Furthermore, in order to facilitate establishing a connection with the remote analog terminal, the first order data may also be set to include the vehicle basic information acquisition request (information such as a vehicle frame number of the vehicle may be requested by the vehicle basic information acquisition request) and the remote analog terminal connection address. Based on the first order data, the user terminal may accurately trigger an accurate point-to-point connection with the remote analog terminal. Wherein, the payment information comprises a payment code (such as a QR code) or a credit card verification information (information such as credit card number, card verification code, and credit card validity date). After the payment is completed based on the payment information, the user terminal receives the first order information sent by the target terminal, so as to determine whether to respond to the first order information to further establish a communication connection with the remote analog terminal.

In the embodiment, after step S104, the method further includes: displaying merchant information and payment information in the first order data.

In the present embodiment, after receiving the first order data, the user terminal may analyze the first order data after receiving the first order data, and automatically display the merchant information and the payment information in the first order data in order for the user to intuitively view the merchant information and the information such as the maintenance fee of the remote diagnostic service of the vehicle. In this way, the user can view key information of the order more conveniently.

S105: When detecting a first order agreement instruction, establishing a connection with a remote analog terminal through the remote analog terminal connection address.

In the present embodiment, if the user operates the user terminal to respond to the first order data and establish a communication connection with the remote analog terminal, the user terminal establishes a connection with the corresponding remote analog terminal according to the connection address of the remote analog terminal in the first order data, thus facilitating subsequent data interaction.

S106: Obtaining electric control system information and basic information of the vehicle.

In the present embodiment, if the user terminal establishes a communication connection with the remote analog terminal, it is further necessary to detect whether the user terminal is connected to an OBD vehicle diagnostic interface on the to-be-detected vehicle (The OBD vehicle diagnostic interface is generally disposed below the instrument panel of the vehicle). After it is determined that the user terminal is connected to the OBD vehicle diagnostic interface on the to-be-detected vehicle, the user terminal may acquire information about the electric control system of the vehicle (for example, information including operational parameters of a system such as an engine, a catalytic converter, an oxygen sensor, and a fuel system, and a fault code of the vehicle) and basic information of the vehicle (For example, information including a vehicle identification code, and the vehicle identification code may also be understood as a frame number), and then it is determined whether to transmit the electric control system information and basic information of the vehicle to the remote analog terminal based on a local diagnostic mode or a remote diagnostic mode selected by the user.

S107: When detecting a remote diagnostic instruction, sending the electric control system information and basic information of the vehicle to the remote analog terminal.

In the present embodiment, after the remote diagnostic mode is selected on the operation interface of the user terminal to trigger the generation of the remote diagnostic instruction, the electronic control system information and the basic information of the vehicle are directly sent to the remote analog terminal to perform remote vehicle simulation, thereby assisting remote fault diagnostic and detection of the vehicle.

In the embodiment, after the step S106, the method further includes: When detecting a local diagnostic instruction, displaying the acquired electric control system information and basic information of the vehicle to perform local diagnostic prompt.

In the present embodiment, after the local diagnostic mode is selected on the operation interface of the user terminal to trigger the generation of the local diagnostic instruction, the electronic control system information and the basic information of the vehicle are directly displayed on the interface local to the user terminal, thereby assisting the fault diagnostic and detection of the vehicle. That is, in addition to the function of diagnosing and detecting the remote fault of the vehicle, the function of local diagnostic may be retained. When the user is enough to pass his/her own maintenance based on local diagnostic, the local diagnostic function may be enabled.

In the embodiment, the step S106 further includes: acquiring a current network delay value; and if it is determined that the current network delay value exceeds a preset delay threshold, sending the electric control system information of the vehicle to a transfer server, so that the transfer server sends the electric control system information of the vehicle to the remote analog terminal.

In the present embodiment, in order to perform data interaction more quickly, a current network delay value when a user terminal communicates with the remote analog terminal may be acquired. If it is determined that the current network delay value exceeds the preset delay threshold (for example, the delay threshold is set to any one of 10-500 ms), indicating that the current network speed is relatively slow, and sending the electric control system information and basic information of the vehicle to the relay server in the server cluster, and then sending the electric control system information and basic information of the vehicle to the remote analog terminal by the relay server. In this way, when the network delay is high, the data transmission speed can be effectively increased by means of the relay server, and the data interaction efficiency can be improved.

In the embodiment, after acquiring the current network delay value, the method further includes: If it is determined that the current network delay value does not exceed the preset delay threshold, establishing a connection with the remote analog terminal through the User Datagram Protocol.

In the present embodiment, the User Datagram Protocol (UDP) is an unconnected transport layer protocol in an open system interconnection reference model. Establishing a connection with the remote analog terminal through the UDP, and performing data communication in the case of low network delay, thereby ensuring data interaction efficiency.

In the embodiment, after the step S107, the method further includes: Receiving second order data sent by the target terminal according to the basic information of the vehicle; The second order data includes merchant information and another payment information; When detecting the second order consent instruction, the communication connection with the remote analog terminal is maintained.

In the present embodiment, the first order data may be an initial free order, and the function thereof is to establish a communication connection with the target terminal and determine the detailed condition of the vehicle based on the first instant messaging data, and then the target terminal recombines the second order data by the basic information of the vehicle to the user terminal. The amount corresponding to another payment information is an actual vehicle fault remote diagnostic service fee, and the actual vehicle fault remote diagnostic service fee corresponding to the second order data (namely, no longer a free amount). In this case, after responding to the second order information, the user terminal continues to maintain a communication connection with the remote analog terminal, so that subsequent data interaction can be facilitated.

S108: Receiving and parsing remote adjustment instructions to obtain vehicle adjustment instructions.

In the present embodiment, after the vehicle is simulated and restored in the remote analog terminal, the electronic control system information and the basic information of the vehicle are loaded in the remote analog terminal, and the vehicle fault diagnostic instrument may be connected to the remote analog terminal by means of a Bluetooth connection, or a wired connection, or a Wi-Fi connection, so as to obtain the electronic control system information and the basic information of the vehicle. After the merchant connects the vehicle fault diagnostic instrument with the remote analog terminal, the merchant can diagnose and detect the vehicle fault based on the side of the remote analog terminal. And after completing the vehicle fault diagnostic and detection, the merchant sends vehicle adjustment instructions to the user terminal, and the user terminal sends the vehicle adjustment instructions to the vehicle for fault elimination.

S109: Sending the adjustment instructions to the vehicle corresponding to the basic information of the vehicle.

In the present embodiment, the remote adjustment instruction is correspondingly generated based on the fault code in the electric control system information of the vehicle, and is sent to the user terminal or the vehicle, and resolved into the vehicle adjustment instructions, so that the vehicle can be correspondingly adjusted for fault elimination.

S110: When detecting a communication end instruction, disconnecting the connection with the remote analog terminal.

In the present embodiment, after the remote diagnostic and maintenance of the vehicle fault is completed, the user terminal may be operated to end the communication process, thereby disconnecting the connection with the remote analog terminal, and at this time, the communication connection between the user terminal and the target terminal may be maintained to continue the instant communication.

The method achieves not only faster acquisition of vehicle data, but also to obtain more description information based on instant messaging communication, which improves the efficiency of remote vehicle diagnostic and exclusion.

Figure 2:
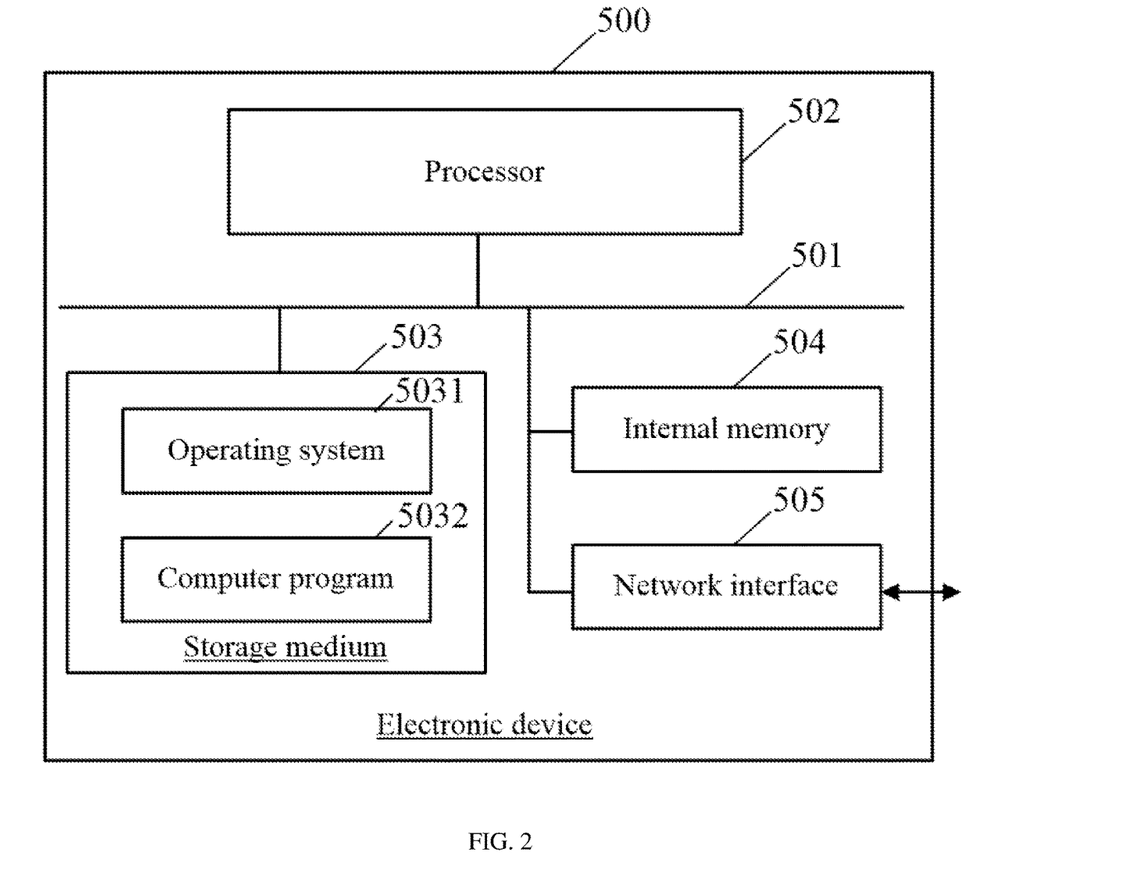
FIG. 2 is a schematic block diagram of an electronic device in accordance with an embodiment of the present application.

The above remote vehicle diagnostic and detection method based on instant messaging communication could be implemented in a form of a computer program, and the computer program could be run on a computer apparatus as shown in FIG. 2. Please refer to FIG. 2, and FIG. 2 is a schematic block diagram of an electronic device in accordance with an embodiment of the present application. The electronic device 500 may be an intelligent terminal integrating a vehicle fault diagnostic function and an instant messaging function.

Referring to FIG. 2, the electronic device 500 includes a processor 502, a memory, and a network interface 505 connected by a system bus 501, wherein, the memory could include a storage medium 503 and an internal memory 504.

The storage medium 503 could store an operating system 5031 and a computer program 5032. When the computer program 5032 is executed, the processor 502 could be caused to perform any one of the vehicle diagnostic and detection method based on instant messaging communication.

The processor 502 is used to provide computing and control capabilities, to support the operation of the entire electronic device 500.

The internal memory 504 provides an environment for operation of the computer program in the storage medium, and when the computer program is executed by the processor 502, the processor 502 could be caused to perform any one of the vehicle diagnostic and detection method based on instant messaging communication.

The network interface 505 is used for network communication, such as sending assigned tasks and the like. Person skilled in the art could understand that, the structure shown in FIG. 2 is only a block diagram of a part of the structure related to the solution of the present disclosure, and does not constitute a limitation of the electronic device 500 to which the solution of the present disclosure is applied, and a specific electronic device 500 may include more or fewer components than those shown in the figure, or combine some components, or have a different arrangement for the components.

Wherein, the processor 502 is for running program code 5032 stored in the memory, to perform any one of the vehicle diagnostic and detection method based on instant messaging communication.

Person skilled in the art could understand that, the structure of the electronic device 500 shown in FIG. 2 does not constitute a limitation to electronic device 500, may include more or fewer components than those shown in the figure, or combine some components, or have a different arrangement for the components. Person skilled in the art could understand that all or part of the processes in the method of the above embodiments may be implemented by a computer program to instruct related hardware, and the program may be stored in a storage medium, and the storage medium is a computer-readable storage medium. In an embodiment of the present disclosure, the program may be stored in a storage medium of a computer system and executed by at least one processor of the computer system, to implement the process steps of the embodiments including the above methods.

It should be understood that, in the embodiment of the present disclosure, the processor 502 may be a central processing unit (Central Processing Unit, CPU), and the processor 502 may also be other general-purpose processor, digital signal processor (Digital Signal Processor, DSP), and application specific integrated circuit (Application Specific Integrated Circuit, ASIC), field-programmable gate array (Field-Programmable Gate Array, FPGA) or other programmable logic device, discrete gate or transistor logic device, discrete hardware component, etc. wherein, the general-purpose processor may be a microprocessor or the processor may be any conventional processor and so on.

In an embodiment of the present disclosure, the program may be stored in a storage medium of a computer system and executed by at least one processor of the computer system, to implement the process steps of the embodiments including the above methods.

Person skilled in the art may realize that, the units and algorithm steps of the various examples described in the embodiments disclosed herein could be implemented by electronic hardware, computer software, or a combination of both, in order to clearly describe interchangeability of hardware and software, the above description has generally described the composition and steps of the various examples according to function. Whether these functions are performed by the manner of hardware or software depends on the specific application and design constraints of technical solution. Person skilled in the art could use different methods to implement the described functions for each particular application, but such implementation should not be considered to be beyond the scope of the present disclosure.

The steps in the method of the embodiments of the present disclosure may be sequentially adjusted, combined, and deleted according to actual needs.

The units in the device of the embodiments of the present disclosure may be combined, divided, and deleted according to actual needs.

Besides, each functional unit in each embodiment of the present disclosure may be integrated into one processing unit, or each unit may separately physically exist, or two or more units may be integrated into one unit. The above integrated unit may be implemented in the form of hardware or in the form of a software functional unit.

The integrated unit, if implemented in the form of a software functional unit and sold or used as an independent product, could be stored in a computer-readable storage medium. Based on such understanding, the essential part or the part contributing to the prior art in the technical solution of the present disclosure, or all or part of the technical solution may be embodied in the form of a software product, and the software product is stored in a storage medium, including some instructions for causing a computer apparatus (may be a personal computer, terminal, or network device, etc.) to perform all or part of the steps of the methods described in various embodiments of the present disclosure.

The above description is only specific embodiments of the present disclosure, but the protection scope of the present disclosure is not limited thereto, and any person skilled in the art could easily conceive various equivalent modifications or alternatives within the technical scope disclosed by the present disclosure, and these modifications or alternatives should all fall into the protection scope of the present disclosure. Therefore, the protection scope of the present disclosure should be subject to the protection scope of the claims.

What is claimed is:

1. A remote vehicle diagnostic and detection method based on instant messaging communication using a user terminal, comprising:
   responding, by a server cluster, to a communication connection instruction, obtaining an online terminal list and displaying the online terminal list;
   when detecting, by the server cluster, a target terminal selection instruction, obtaining the target terminal from the online terminal list, and establishing a communication connection with the target terminal;
   acquiring, by the server cluster, a first instant messaging data and sending the first instant messaging data to the target terminal;
   receiving, by the user terminal, a first order data sent by the target terminal according to the first instant messaging data; wherein the first order data comprises a vehicle basic information acquisition request, merchant information, payment information, and a remote analog terminal connection address;
   when detecting, by the target terminal, a first order agreement instruction, establishing a connection with a remote analog terminal through the remote analog terminal connection address;
   obtaining, by the user terminal, electric control system information and basic information of the vehicle;
   when detecting, by the user terminal, a remote diagnostic instruction, sending the electric control system information and basic information of the vehicle to the remote analog terminal;
   receiving and parsing, by the user terminal, remote adjustment instructions to obtain vehicle adjustment instructions;
   sending, by the user terminal, the adjustment instructions to the vehicle corresponding to the basic information of the vehicle; and
   when detecting, by the target terminal, a communication end instruction, disconnecting the connection with the remote analog terminal.

2. The method as claimed in claim 1, wherein before the step of responding to the communication connection instruction, obtaining the online terminal list and displaying the online terminal list further comprises the steps of:
   obtaining user's account information, and obtaining user's vehicle type information according to the user's account information;
   sending the user's vehicle type information to the server cluster; and
   receiving the online terminal list sent by the server cluster according to user's vehicle type information.

3. The method as claimed in claim 1, wherein the first instant messaging data is composed of one or more of text data, picture data, voice data, and video data.

4. The method as claimed in claim 1, wherein before the step of receiving the first order data sent by the target terminal according to the first instant messaging data further comprises the step of:
   displaying merchant information and payment information in the first order data.

5. The method as claimed in claim 1, wherein after the step of obtaining electric control system information and basic information of the vehicle further comprises the step of:
   when detecting a local diagnostic instruction, displaying the acquired electric control system information and basic information of the vehicle to perform local diagnostic prompt.

6. The method as claimed in claim 1, wherein the step of when detecting the remote diagnostic instruction, sending the electric control system information and basic information of the vehicle to the remote analog terminal further comprises the steps of:
   acquiring a current network delay value; and
   if it is determined that the current network delay value exceeds a preset delay threshold, sending the electric control system information of the vehicle to a transfer server, so that the transfer server sends the electric control system information of the vehicle to the remote analog terminal.

7. The method as claimed in claim 6, wherein after the step of acquiring the current network delay value further comprises the step of:
   if it is determined that the current network delay value does not exceed the preset delay threshold, establishing a connection with the remote analog terminal through the User Datagram Protocol.

8. The method as claimed in claim 1, wherein after the step of sending the electric control system information and basic information of the vehicle to the remote analog terminal further comprises the steps of:
   receiving a second order data sent by the target terminal according to the basic information of the vehicle; wherein the second order data comprises merchant information and another payment information; and
   when detecting the second order consent instruction, the communication connection with the remote analog terminal is maintained.

9. An electronic device, comprising:
   a memory, for storing a program to execute in a processor; and
   the processor, for executing the program stored in the memory to achieve the method comprising the steps of:
   responding, by a server cluster, to a communication connection instruction, obtaining an online terminal list and displaying the online terminal list;
   when detecting, by the server cluster, a target terminal selection instruction, obtaining the target terminal from the online terminal list, and establishing a communication connection with the target terminal;
   acquiring, by the server cluster, a first instant messaging data and sending the first instant messaging data to the target terminal;
   receiving, by the user terminal, a first order data sent by the target terminal according to the first instant messaging data; wherein the first order data comprises a vehicle basic information acquisition request, merchant information, payment information, and a remote analog terminal connection address;
   when detecting, by the target terminal, a first order agreement instruction, establishing a connection with a remote analog terminal through the remote analog terminal connection address;
   obtaining, by the user terminal, electric control system information and basic information of the vehicle;
   when detecting, by the user terminal, a remote diagnostic instruction, sending the electric control system information and basic information of the vehicle to the remote analog terminal;

receiving and parsing, by the user terminal, remote adjustment instructions to obtain vehicle adjustment instructions;

sending, by the user terminal, the adjustment instructions to the vehicle corresponding to the basic information of the vehicle; and when detecting, by the target terminal, a communication end instruction, disconnecting the connection with the remote analog terminal.

10. The electronic device as claimed in claim 9, wherein before the step of responding to the communication connection instruction, obtaining the online terminal list and displaying the online terminal list further comprises the steps of:

obtaining user's account information, and obtaining user's vehicle type information according to the user's account information;

sending the user's vehicle type information to the server cluster; and receiving the online terminal list sent by the server cluster according to user's vehicle type information.

11. The electronic device as claimed in claim 9, wherein the first instant messaging data is composed of one or more of text data, picture data, voice data, and video data.

12. The electronic device as claimed in claim 9, wherein before the step of receiving the first order data sent by the target terminal according to the first instant messaging data further comprises the step of:

displaying merchant information and payment information in the first order data.

13. The electronic device as claimed in claim 9, wherein after the step of obtaining electric control system information and basic information of the vehicle further comprises the step of:

when detecting a local diagnostic instruction, displaying the acquired electric control system information and basic information of the vehicle to perform local diagnostic prompt.

14. The electronic device as claimed in claim 9, wherein the step of when detecting the remote diagnostic instruction, sending the electric control system information and basic information of the vehicle to the remote analog terminal further comprises the steps of:

acquiring a current network delay value; and if it is determined that the current network delay value exceeds a preset delay threshold, sending the electric control system information of the vehicle to a transfer server, so that the transfer server sends the electric control system information of the vehicle to the remote analog terminal.

15. The electronic device as claimed in claim 14, wherein after the step of acquiring the current network delay value further comprises the step of:

if it is determined that the current network delay value does not exceed the preset delay threshold, establishing a connection with the remote analog terminal through the User Datagram Protocol.

16. The electronic device as claimed in claim 9, wherein after the step of sending the electric control system information and basic information of the vehicle to the remote analog terminal further comprises the steps of:

receiving a second order data sent by the target terminal according to the basic information of the vehicle; wherein the second order data comprises merchant information and another payment information; and when detecting the second order consent instruction, the communication connection with the remote analog terminal is maintained.

17. A non-transitory computer readable storage medium, for storing one or more programs executed by one or more processors to achieve the method comprising the steps of:

responding, by a server cluster, to a communication connection instruction, obtaining an online terminal list and displaying the online terminal list;

when detecting, by the server cluster, a target terminal selection instruction, obtaining the target terminal from the online terminal list, and establishing a communication connection with the target terminal;

acquiring, by the server cluster, a first instant messaging data and sending the first instant messaging data to the target terminal;

receiving, by the user terminal, a first order data sent by the target terminal according to the first instant messaging data; wherein the first order data comprises a vehicle basic information acquisition request, merchant information, payment information, and a remote analog terminal connection address;

when detecting, by the target terminal, a first order agreement instruction, establishing a connection with a remote analog terminal through the remote analog terminal connection address;

obtaining, by the user terminal, electric control system information and basic information of the vehicle;

when detecting, by the user terminal, a remote diagnostic instruction, sending the electric control system information and basic information of the vehicle to the remote analog terminal;

receiving and parsing, by the user terminal, remote adjustment instructions to obtain vehicle adjustment instructions;

sending, by the user terminal, the adjustment instructions to the vehicle corresponding to the basic information of the vehicle; and when detecting, by the target terminal, a communication end instruction, disconnecting the connection with the remote analog terminal.

18. The non-transitory computer readable storage medium as claimed in claim 17, wherein before the step of responding to the communication connection instruction, obtaining the online terminal list and displaying the online terminal list further comprises the steps of:

obtaining user's account information, and obtaining user's vehicle type information according to the user's account information;

sending the user's vehicle type information to the server cluster; and receiving the online terminal list sent by the server cluster according to user's vehicle type information.

19. The non-transitory computer readable storage medium as claimed in claim 17, wherein the first instant messaging data is composed of one or more of text data, picture data, voice data, and video data.

20. The non-transitory computer readable storage medium as claimed in claim 17, wherein before the step of receiving the first order data sent by the target terminal according to the first instant messaging data further comprises the step of:

displaying merchant information and payment information in the first order data.

* * * * *